United States Patent
Oh et al.

(10) Patent No.: US 10,692,648 B2
(45) Date of Patent: Jun. 23, 2020

(54) MAGNETIC FIELD SHIELDING STRUCTURE AND MOBILE DEVICE INCLUDING THE MAGNETIC FIELD STRUCTURE

(71) Applicant: WITS Co., Ltd., Yongin-si, Gyeonggi-do (KR)

(72) Inventors: Seung Hee Oh, Suwon-si (KR); Doo Ho Park, Suwon-si (KR); Tae Jun Choi, Suwon-si (KR); Sung Nam Cho, Suwon-si (KR); Chang Hak Choi, Suwon-si (KR); Jung Young Cho, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 191 days.

(21) Appl. No.: 15/826,299

(22) Filed: Nov. 29, 2017

(65) Prior Publication Data

US 2018/0286574 A1    Oct. 4, 2018

(30) Foreign Application Priority Data

Apr. 3, 2017  (KR) .................. 10-2017-0043152
Apr. 7, 2017  (KR) .................. 10-2017-0045125

(51) Int. Cl.
*H01F 27/36* (2006.01)
*H01F 27/34* (2006.01)
*H02J 7/02* (2016.01)
*H01F 27/28* (2006.01)
*H02J 50/12* (2016.01)
(Continued)

(52) U.S. Cl.
CPC ......... *H01F 27/346* (2013.01); *H01F 27/288* (2013.01); *H01F 27/289* (2013.01); *H01F 27/2885* (2013.01); *H01F 27/365* (2013.01); *H02J 7/025* (2013.01); *H02J 50/10* (2016.02); *H02J 50/12* (2016.02); *H02J 50/70* (2016.02)

(58) Field of Classification Search
CPC ........................................................ H02J 7/025
USPC ........................................................ 320/108
See application file for complete search history.

(56) References Cited

U.S. PATENT DOCUMENTS

2014/0042820 A1  2/2014  Park et al.
2015/0123604 A1*  5/2015  Lee .................. H01F 38/14
                                                    320/108
(Continued)

FOREIGN PATENT DOCUMENTS

KR  10-2013-0072181 A  7/2013
KR  10-2014-0021102 A  2/2014
(Continued)

OTHER PUBLICATIONS

S. Kim et al., "Design and Analysis of a Resonant Reactive Shield for a Wireless Power Electric Vehicle," IEEE Transactions on Microwave Theory and Techniques, vol. 62, No. 4, Apr. 2014, pp. 1057-1066.

*Primary Examiner* — Edward Tso
*Assistant Examiner* — Ahmed H Omar
(74) *Attorney, Agent, or Firm* — Harness, Dickey & Pierce, P.L.C.

(57) ABSTRACT

A magnetic field shielding structure includes a magnetic layer and a resonance reactive shielding circuit including a capacitor and a conductor connected to the capacitor and having a loop form. At least a portion of the magnetic layer overlaps an area surrounded by the conductor in a thickness direction of the magnetic layer.

17 Claims, 8 Drawing Sheets

(51) Int. Cl.
*H02J 50/10* (2016.01)
*H02J 50/70* (2016.01)

(56) References Cited

U.S. PATENT DOCUMENTS

2015/0334886 A1    11/2015  Jang et al.
2016/0050469 A1*    2/2016  Subiry .................... H04Q 9/00
                                                    340/870.17
2016/0345474 A1    11/2016  Oh et al.

FOREIGN PATENT DOCUMENTS

| KR | 10-1399024 B1 | 5/2014 |
| KR | 10-1643924 B1 | 7/2016 |
| KR | 10-2016-0090420 A | 8/2016 |

\* cited by examiner

MAGNETIC FIELD SHIELDING STRUCTURE AND MOBILE DEVICE INCLUDING THE MAGNETIC FIELD STRUCTURE

CROSS-REFERENCE TO RELATED APPLICATIONS

This application claims the benefit under 35 USC 119(a) of Korean Patent Application Nos. 10-2017-0043152 filed on Apr. 3, 2017, and 10-2017-0045125 filed on Apr. 7, 2017, in the Korean Intellectual Property Office, the entire disclosures of which are incorporated herein by reference for all purposes.

BACKGROUND

1. Field

The present disclosure relates to a magnetic field shielding structure and a mobile device including the magnetic fielding structure.

2. Description of Related Art

Recently, mobile devices having a wireless charging capability that are compliant with a Wireless Power Consortium (WPC) communication protocol, a Near Field Communication (NFC) communication protocol, or a Magnetic Secure Transmission (MST) communication protocol have been introduced. The WPC, NFC, and MST communication protocols have different operating frequencies, different data transmission rates, and different power transmitting capabilities.

Such mobile devices may include a magnetic material sheet to block and focus electromagnetic waves. For example, a magnetic material sheet may be disposed between a power receiving coil and a battery of such a mobile device operating as a wireless power receiver to prevent a magnetic field generated in the power receiving coil from reaching the battery and enable electromagnetic waves generated by a wireless power transmitter to be efficiently transmitted to the power receiving coil of the mobile device. Such a magnetic material sheet needs to be relatively thick to provide sufficient shielding performance, thereby increasing the thickness of the mobile device. In addition, as the thickness of the magnetic material sheet increases, a core loss in a high frequency band also increases. Thus, an increase in performance due to an increase in the thickness of the magnetic material sheet may be less than expected.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a magnetic field shielding structure includes a magnetic layer; and a resonance reactive shielding circuit including a capacitor and a conductor connected to the capacitor and having a loop form; wherein at least a portion of the magnetic layer overlaps an area surrounded by the conductor in a thickness direction of the magnetic layer.

The conductor may be disposed on a surface of the magnetic layer.

The capacitor may be disposed on a surface of the magnetic layer.

The magnetic field shielding structure further include a bonding layer interposed between the magnetic layer and the conductor and bonding the magnetic layer to the conductor.

The conductor may be a conductor in a circuit board.

The magnetic layer may be disposed in an area surrounded by the conductor.

The magnetic layer and the conductor may be disposed on a same level.

The capacitor may be a multilayer ceramic capacitor.

The conductor may be a coil having at least two turns.

The coil may be a solenoid.

Different turns of the coil may be disposed on a same level.

The capacitor and the conductor may form an LC circuit.

The resonance reactive shielding circuit may be electrically isolated.

The magnetic layer may include a plurality of magnetic layers forming a stacked structure.

The conductor may be disposed on a surface of the stacked structure.

The conductor may be interposed between two adjacent magnetic layers of the stacked structure.

The conductor may surround a side surface of the stacked structure.

The magnetic field shielding structure may further include another one of the resonance reactive shielding circuit.

The conductor of the resonance reactive shielding circuit may be disposed on one surface of the magnetic layer; and the conductor of the other resonance reactive shielding circuit may be disposed on another surface of the magnetic layer on an opposite side of the magnetic layer from the one surface.

The conductor of the resonance reactive shielding circuit and the conductor of the other resonance reactive shielding circuit may be disposed on a same surface of the magnetic layer.

In another general aspect, a mobile device includes a mobile device body; a battery; a coil portion; and a magnetic field shielding structure interposed between the battery and the coil portion and including a magnetic layer and a resonance reactive shielding circuit including a capacitor and a conductor connected to the capacitor and having a loop form, wherein at least a portion of the magnetic layer overlaps an area surrounded by the conductor in a thickness direction of the magnetic layer.

The magnetic layer may be interposed between the resonance reactive shielding circuit and the coil portion.

In another general aspect, a magnetic field shielding structure includes a magnetic layer; and a resonance reactive shielding circuit configured to block at least a portion of a magnetic field passing through the magnetic layer and including a capacitor and a conductor connected to both ends of the capacitor and having a loop form.

The resonance reactive shielding circuit may have a resonant frequency substantially equal to a frequency of the magnetic field.

At least a portion of the magnetic layer may be disposed between the power receiving coil and the resonance reactive shielding circuit.

The conductor may be disposed on a surface of the magnetic layer, or inside the magnetic layer, or in an area surrounded by the conductor.

In another general aspect, a mobile device includes a mobile device body; a battery disposed in the mobile device body; a power receiving coil disposed in the mobile device body and configured to receive wireless power by either one or both of magnetic induction and magnetic resonance; and a magnetic field shielding structure disposed in the mobile device body between the battery and the power receiving coil and configured to block at least a portion of a magnetic field generated by the power receiving coil from reaching the battery; wherein the magnetic field shielding structure includes a magnetic layer configured to block at least a portion of the magnetic field generated by the power receiving coil from passing through the magnetic layer; and a resonance reactive shielding circuit configured to block at least a portion of any leakage magnetic field passing through the magnetic layer from the magnetic field generated by the power receiving coil and including a capacitor and a conductor connected to both ends of the capacitor and having a loop form.

The magnetic layer may be further configured to block the at least a portion of the magnetic field generated by the power receiving coil by a magnetic induction method; and the resonance reactive shielding circuit may be further configured to block the at least a portion of any leakage magnetic field passing through the magnetic layer by a magnetic resonance method.

At least a portion of the magnetic layer may be disposed between the power receiving coil and the resonance reactive shielding circuit.

The conductor may be disposed on a surface of the magnetic layer, or inside the magnetic layer, or in an area surrounded by the conductor.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms. and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, it will be understood that when an element, such as a layer, region or wafer (substrate), is referred to as being "on," "connected to," or "coupled to" another element, it can be directly "on," "connected to," or "coupled to" the other element, or there may be other elements intervening between the two elements, i.e., it may be indirectly "on," "connected to," or "coupled to" the other element. In contrast, when an element is referred to as being "directly on," "directly connected to," or "directly coupled to" another element, there may be no other elements between the two elements. As used herein, the term "and/or" includes any one and any combination of any two or more of the associated listed items.

Figure 1:
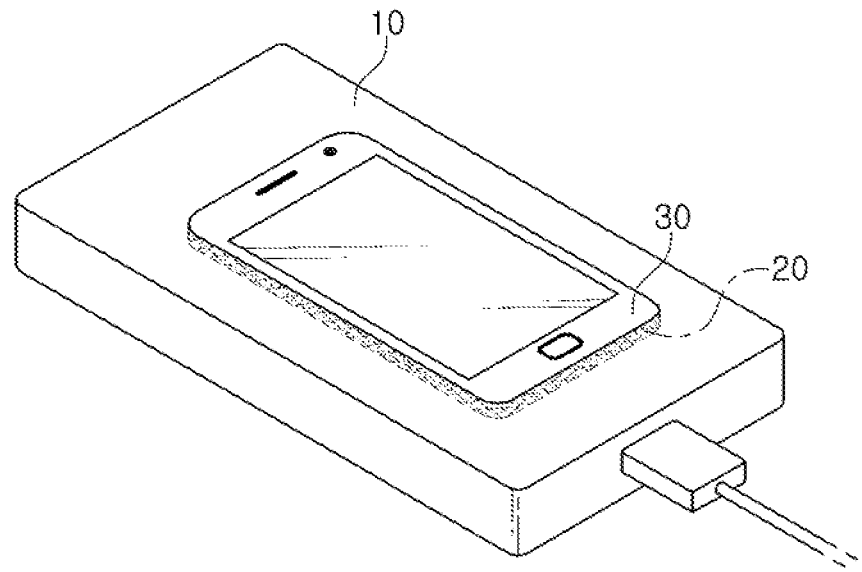
FIG. 1 is a perspective view of an example of exteriors of a mobile device and a wireless charging system applied thereto.
Figure 2:
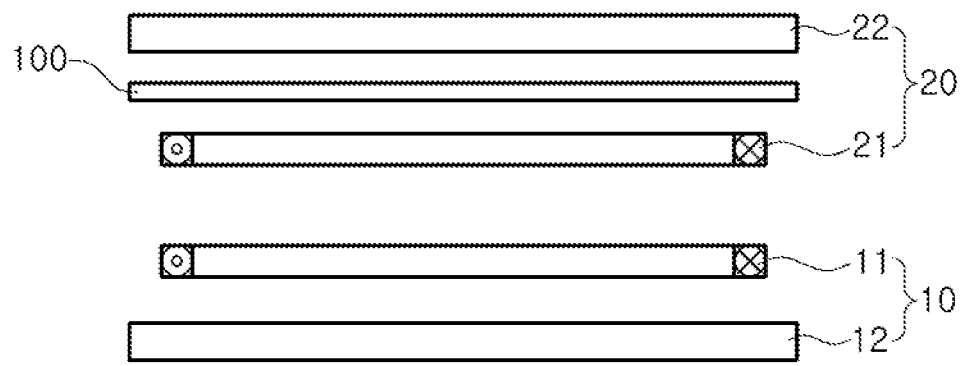
FIG. 2 is an exploded cross-sectional view of an example a main internal configuration of the mobile device and the wireless charging system of FIG. 1.

FIG. 1 is a perspective view of an example of exteriors of a mobile device and a wireless charging system applied thereto. FIG. 2 is an exploded cross-sectional view of an example of a main internal configuration of the mobile device and the wireless power charging system of FIG. 1.

Referring to FIGS. 1 and 2, a mobile device and a wireless charging system applied thereto include a wireless power transmitter 10 and a wireless power receiver 20. In the example in FIGS. 1 and 2, the wireless power receiver 20 is included in a mobile device 30, such as a mobile phone, a laptop computer, or a tablet PC.

In an interior of the wireless power transmitter 10, a power transmitting coil 11 is formed on a substrate 12, so when alternating current (AC) power is applied to the wireless power transmitting coil 11, a magnetic field is generated on a periphery of the wireless power transmitting coil 11. This magnetic field induces an electromotive force in a power receiving coil 21 embedded in the wireless power receiver 20, enabling a battery 22 of the wireless power receiver 20 to be charged by the electromotive force induced in the power receiving coil 21.

The battery 22 may be, for example, a rechargeable battery, such as a nickel-metal hydride (NiMH) battery or a lithium-ion (Li-ion) battery, but is not limited thereto. In addition, the battery 22 may be detachable from the wireless power receiver 20, may be integrated with the wireless power receiver 20.

The power transmitting coil 11 and the power receiving coil 21 are electromagnetically coupled to each other, and may be formed by winding a metallic wire, such as copper (Cu), to form a coil. The winding may be circular, oval, quadrangular, diamond-shaped, or any other shape. An overall size, a number of turns, and other parameters of the coil may vary depending on required characteristics.

A magnetic field shielding structure 100 is interposed between the power receiving coil 21 and the battery 22. The magnetic field shielding structure 100 is interposed between the power receiving coil 21 and the battery 22 to focus magnetic flux transmitted by the wireless power transmitter 10 so that the magnetic flux is efficiently received by the power receiving coil 21. In addition, the magnetic field shielding structure 100 prevents at least a portion of the magnetic flux from reaching the battery 22.

The magnetic field shielding structure 100 may be combined with a coil portion to be applied to a receiving portion of a wireless charging device described above. The coil portion may be used in magnetic secure transmission (MST) communications and near field communication (NFC) communications, in addition to the wireless charging device. In addition, the magnetic field shielding structure 100 may also be applied to a transmitting portion, as well as the receiving portion of the wireless charging device. Hereinafter, an entirety of a power transmitting coil and a power receiving coil may be referred to as a coil portion. Hereinafter, the magnetic field shielding structure 100 will be described in more detail.

Figure 3:
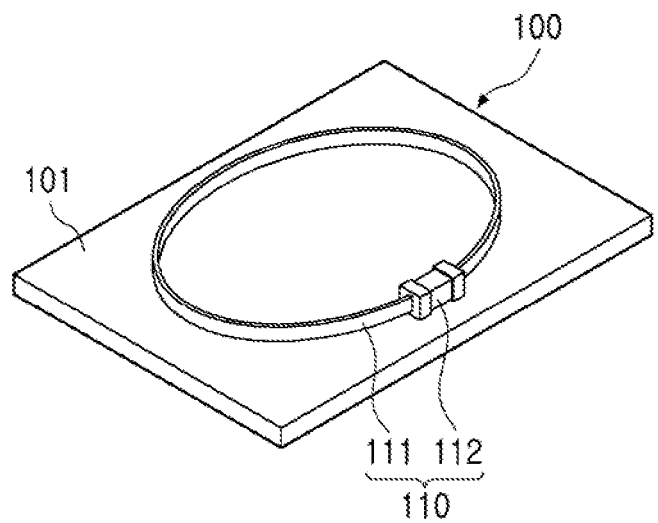
FIG. 3 is a schematic perspective view of an example of a magnetic field shielding structure.
Figure 4:
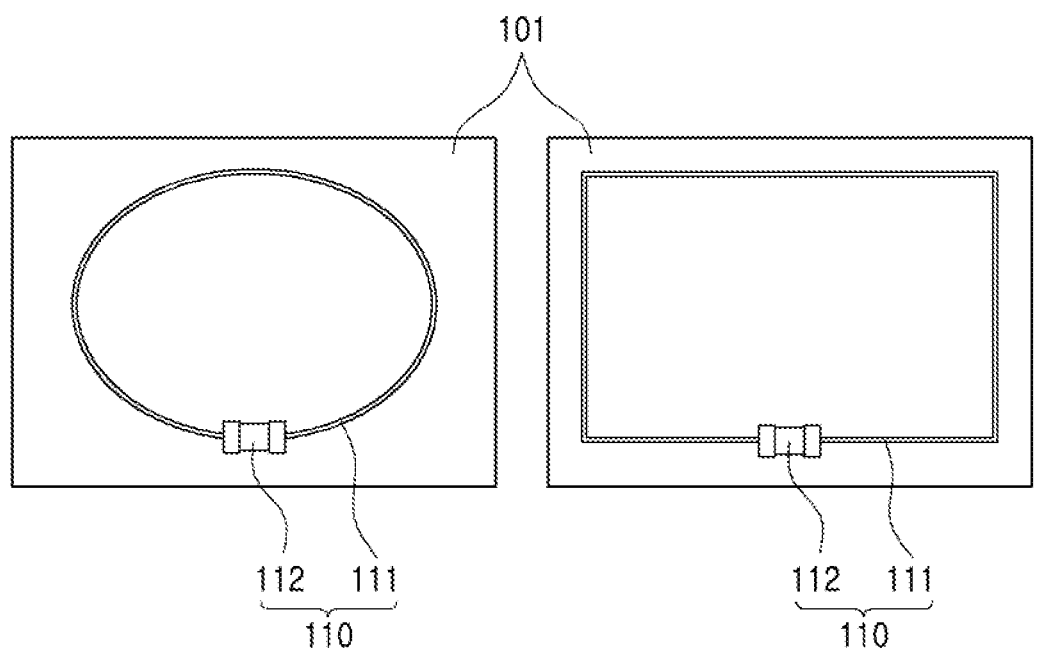
FIG. 4 is a top view illustrating examples of a resonance reactive shielding circuit of FIG. 3.

FIG. 3 is a schematic perspective view of an example of a magnetic field shielding structure. FIG. 4 is a top view illustrating examples of a resonance reactive shielding circuit of FIG. 3.

Referring to FIG. 3, a magnetic field shielding structure 100 includes a magnetic layer 101 and a resonance reactive shielding circuit 110. The resonance reactive shielding circuit 110 includes a capacitor 112 and a conductor 111 connected to the capacitor 112 and having a loop form. In addition, at least a portion of the magnetic layer 101 overlaps an area surrounded by the conductor 111 in a thickness direction of the magnetic layer 101. That is, a line extending in the thickness direction of the magnetic layer 101 passes through both the magnetic layer 101 and the area surrounded by the conductor 111 where the magnetic layer 101 overlaps the area surrounded by the conductor 111. The thickness direction of the magnetic layer 101 is defined as a direction perpendicular to a main surface of the magnetic layer 101 having a sheet form.

The magnetic layer 101 that focuses and blocks electromagnetic waves may be formed using a metal ribbon or a thin plate including an amorphous alloy or a nanocrystalline alloy. An iron (Fe)-based or cobalt (Co)-based magnetic alloy may be used as the nanocrystalline alloy. The Fe-based magnetic alloy may be formed using a material including silicon (Si), such as an Fe—Si—boron (B) alloy. When a content of a metal, such as Fe, is relatively high, a saturation magnetic flux density is increased. However, when an Fe content is significantly high, it is difficult to form the nanocrystalline alloy. Thus, the Fe content may be in a range of 70 atomic % to 90 atomic %. A sum of an Si content and a B content may be in a range of 10 atomic % to 30 atomic %, in terms of the possibility to form the nanocrystalline alloy. In order to prevent corrosion, a corrosion resistant element, such as chromium (Cr) and Co, may be added to a basic composition described above in an amount of 20 atomic % or less, and a relatively small amount of another metallic element may be included to provide other characteristics as required.

In a case in which the nanocrystalline alloy is used, an Fe-based nanocrystalline magnetic alloy may be used as an example. An Fe—Si—B—Cu-niobium (Nb) alloy may be used as the Fe-based nanocrystalline alloy.

The magnetic layer 101 may be formed using ferrite in addition to an alloy. For example, the magnetic layer 101 may be formed using a manganese (Mn)-zinc (Zn)-based ferrite material, an Mn-nickel (Ni)-based ferrite material, a barium (Ba)-based ferrite material, or a strontium (Sr)-based ferrite material. Furthermore, materials described above may be formed as a nanocrystalline powder. In addition, the magnetic layer 101 may be formed using a polymer composite having a form in which a base material, such as a resin, is filled with a magnetic particle. The magnetic layer 101 may be provided in an integrated form, but may have a structure in which the magnetic layer 101 is fragmented into a plurality of pieces. Such a fragmented structure provides electrical insulating properties among the plurality of pieces, thereby contributing to a reduction in an eddy current generated in a magnetic layer. The fragmented structure may randomly be formed, but may be provided in a form of a crack portion in which a surface of the magnetic layer 101 is fragmented. A magnetic permeability of the magnetic layer 101 may be adjusted using the crack portion having a regularly fragmented structure. The magnetic permeability may be changed by changing a degree of fragmentation of each area of the magnetic layer 101. A plurality of crack portions may be arranged in a regular form and at a regular interval.

The resonance reactive shielding circuit 110 has a structure in which resonance and electromagnetic induction are possible with respect to a magnetic field directed toward the magnetic layer 101 or passing through the magnetic layer 101. To this end, the resonance reactive shielding circuit 110 includes the conductor 111 having a loop form and the capacitor 112 connected to both ends of the conductor 111. In the example illustrated in FIG. 3, the conductor 111 and the capacitor 112 are disposed on a same surface of the magnetic layer 101. Using an arrangement method described above, at least a portion of the magnetic layer 101 overlaps an area surrounded by the conductor 111 in a thickness direction of the magnetic layer 101.

Opposite ends of the conductor 111 are connected to electrodes of the capacitor 112. The capacitor 112 forms an LC circuit by being connected to the conductor 111. In one example, the capacitor 112 is a multilayer ceramic capacitor (MLCC), which is a chip component. An MLCC has an excellent structural stability and a relatively high capacitance, and thus is a suitable choice to effectively adjust a resonant frequency of the resonance reactive shielding circuit 110. However, other types of capacitors, such as a chip-type ceramic capacitor, a tantalum (Ta) capacitor, a planar capacitor, or a variable capacitor, may be used instead of an MLCC.

Referring to FIG. 4, a loop form of the conductor 111 may be rectangular instead of oval.

The conductor 111 is made of a material having electrical conductivity. For example, the conductor 111 may be a metal conductor, such as a copper (Cu) conductor.

In terms of a function and an operating principle of the resonance reactive shielding circuit 110, in a case in which a leakage magnetic field leaking into the resonance reactive shielding circuit 110 induces an electric current in the conductor 111, and the induced current generates a magnetic field opposing the leakage magnetic field, thereby offsetting and blocking the leakage magnetic field. In detail, in a case in which the at least a portion of the magnetic layer 101 overlaps an area surrounded by the conductor 111 in the thickness direction of the magnetic layer 101, a magnetic field directed toward the magnetic layer 101 or passing therethrough will be effectively blocked by a resonance reaction of the resonance reactive shielding circuit 110. The resonant frequency of the resonance reactive shielding circuit 110 may be set to be substantially equal to a frequency of the leakage magnetic field to be blocked by the resonance reactive shielding circuit 110.

The blocking of the magnetic field by the resonance reaction generates a relatively low level of impedance, resulting in a lower induction loss compared to blocking of the magnetic field by a magnetic material sheet. In addition, the conductor 111 having a loop form may be relatively thin and small, thereby contributing to slimming of the magnetic field shielding structure 100. A shielding function is improved by employing the resonance reactive shielding circuit 110 together with the magnetic layer 101. Furthermore, the magnetic field shielding structure 100 used for various purposes may be implemented by changing shielding characteristics of the magnetic layer 101 and the resonance reactive shielding circuit 110. For example, the magnetic layer 101 may perform a shielding function for wireless charging using a magnetic induction method. The resonance reactive shielding circuit 110 may perform a shielding function for wireless charging using a magnetic resonance method, and vice versa. In addition, at least a portion of the magnetic layer 101 and the resonance reactive shielding circuit 110 may be used in performing an NFC function or an MST function, in addition to performing a WPC function.

In another example, to reduce a thickness of the resonance reactive shielding circuit 110, the capacitor 112 is not disposed on the magnetic layer 101, but is disposed off the magnetic layer 101. When the capacitor 112 is disposed off the magnetic layer 101, the capacitor 112 is disposed in a different area of a wireless charging device while being electrically connected to the conductor 111.

The conductor 111 and the capacitor 112 form an LC circuit, thereby enabling the resonance reactive shielding circuit 110 to perform a shielding function by the resonance reaction. In addition, the conductor 111 and the capacitor 112 enable a resonance phenomenon to occur at a specific frequency determined by an L value and a C value of the LC circuit. The L value and the C value of the LC circuit may be adjusted to change the specific frequency at which the resonance phenomenon occurs. The conductor 111 and the capacitor 112 are electrically isolated from a different circuit, such as an external conductor. In other words, the resonance reactive shielding circuit 110 does not include an additional circuit, in addition to the conductor 111 and the capacitor 112, and is electrically isolated.

FIGS. 5 to 11 illustrate other examples of a magnetic field shielding structure.

Figure 5:
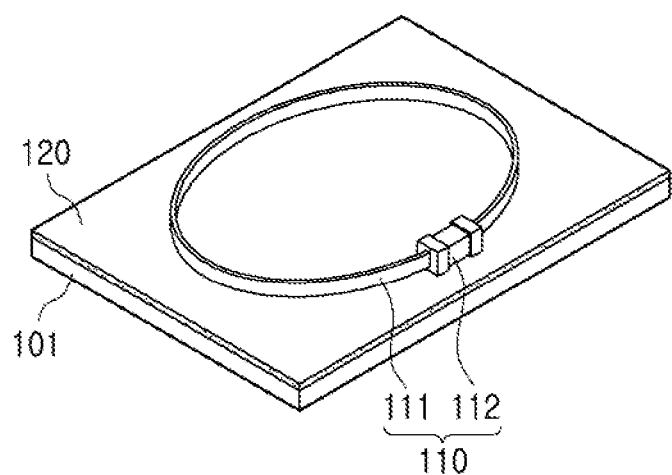
FIGS. 5 to 11 illustrate other examples of a magnetic field shielding structure.

FIG. 5 illustrates an example of a structure in which a bonding layer 120 is interposed between a magnetic layer 101 and a conductor 111 to stably bond the magnetic layer 101 to the conductor 111. In contrast, the examples described above do not include a bonding layer. A direct combination structure described above may be implemented, for example, using a method in which a conductor is printed on the magnetic layer 101. However, in another example, a more stable combination structure is formed by employing the bonding layer 120. In a case in which the bonding layer 120 is appropriate to bond the magnetic layer 101 to the conductor 111, any bonding layer that is commonly used in the related art may be employed. For example, double-sided tape may be used.

Figure 6:
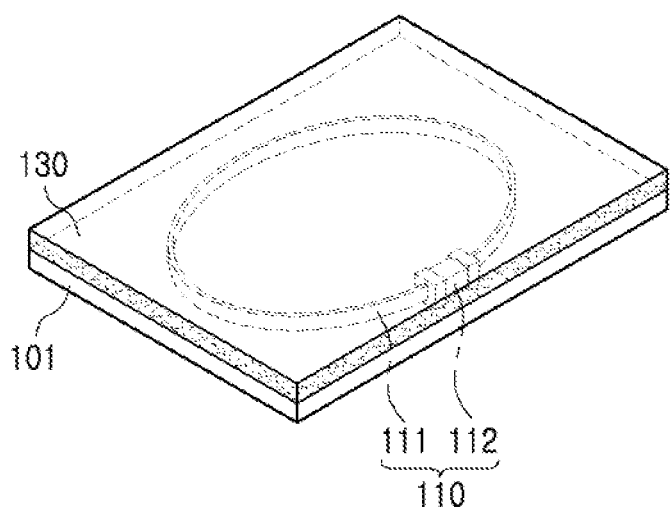

FIG. 6 illustrates an example in which a resonance reactive shielding circuit 110 is implemented in a circuit board 130. To this end, the conductor 111 having a loop form and a capacitor 112 are formed using a printed circuit board (PCB) process known in the related art. For example, the circuit board 130 may be a flexible printed circuit board (FPCB). The resonance reactive shielding circuit 110 may be implemented to have a form of the circuit board 130, so that structural stability may be secured, and a resonant frequency of an LC circuit formed by the resonance reactive shielding circuit 110 may be effectively adjusted. However, in another example, only the conductor 111 through which magnetic flux passes is formed in the circuit board 130, while the capacitor 112 is disposed in a different area.

Figure 7:
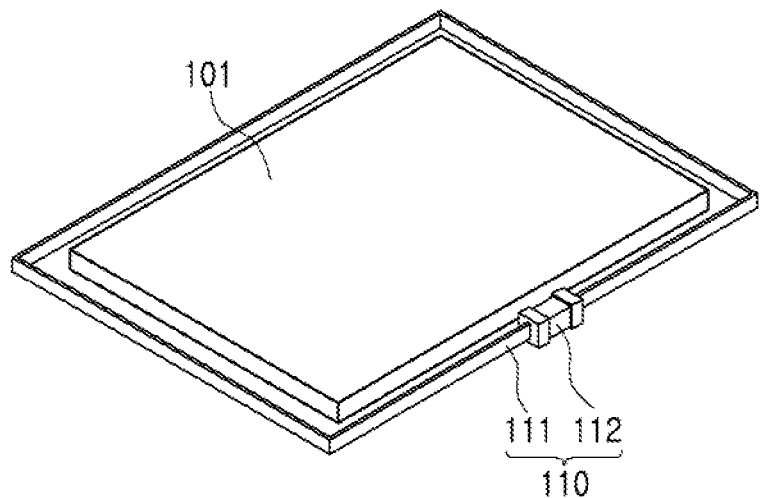

FIG. 7 illustrates an example in which the magnetic layer 101 is disposed within a loop of the conductor 111. In other words, the magnetic layer 101 is disposed in an area surrounded by the conductor 111. To this end, a size of the loop of the conductor 111 is greater than a size of the magnetic layer 101. In a case in which the conductor 111 surrounds the magnetic layer 101 and is disposed on a same level as the magnetic layer 101 as illustrated in FIG. 7, a sufficient shielding performance may be obtained, and an overall thickness of the magnetic field shielding structure may be reduced. FIG. 7 illustrates an example in which the magnetic layer 101 is spaced apart from the conductor 111. However, in another example, the conductor 111 contacts an inner surface of the magnetic layer 101.

Figure 8:
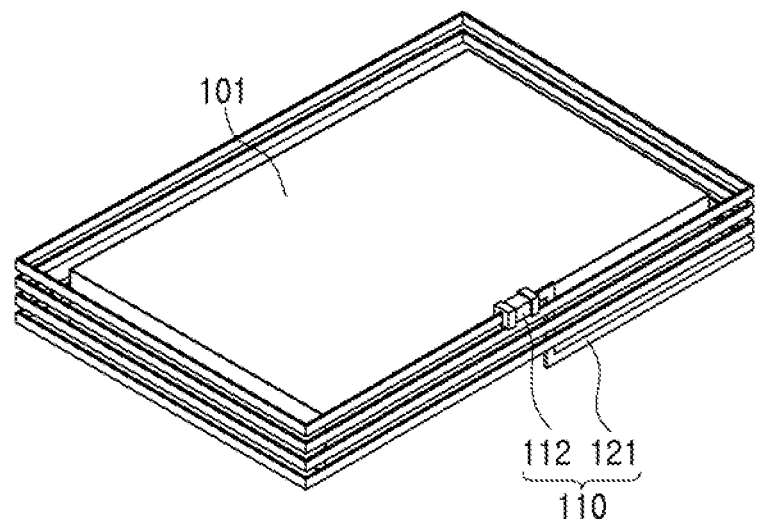
Figure 9:
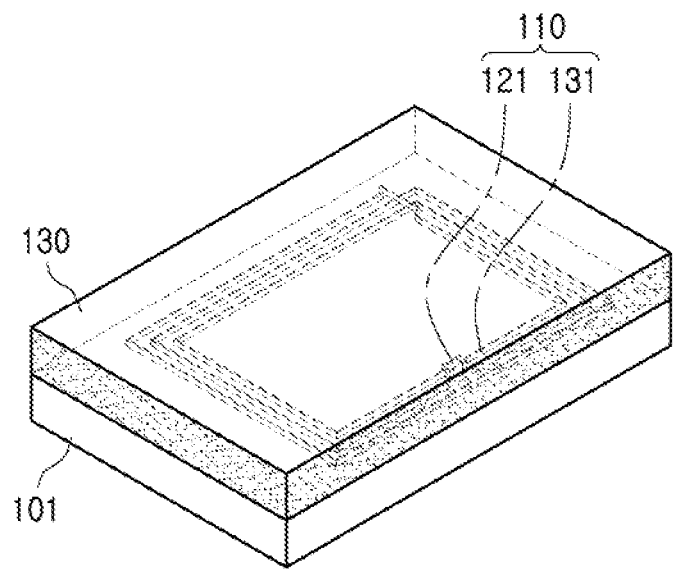

FIG. 8 illustrates an example in which a conductor 121 has a different form compared to the conductor 110 of FIGS. 3-7. In detail, in order to adjust the resonant frequency and shielding characteristics of the resonance reactive shielding circuit 110, the conductor 121 is a coil having at least two turns. In the example illustrated in FIG. 8, the coil has four turns. However, this is merely an example, and the coil have greater or fewer than four turns. In order to form the coil structure having a plurality of turns, the conductor 121 may have a solenoid coil structure as illustrated in FIG. 9. In addition, at least one end of the conductor 121 may be bent to be connected to an electrode of the capacitor 112.

FIG. 9 illustrates an example in which a conductor 131 having a coil structure having a plurality of turns is formed in the circuit board 130. Coil patterns forming different turns in the coil structure are formed on a same level. A portion of the conductor 131 may be bent to be connected to the capacitor 112. However, in a case in which the circuit board 130 is a multilayer circuit board, a conductor 131 having a solenoid coil structure as in the example of FIG. 8 may be formed in the multilayer circuit board by forming coil patterns forming different turns in the solenoid coil structure on different layers of the multilayer circuit board.

Figure 10:
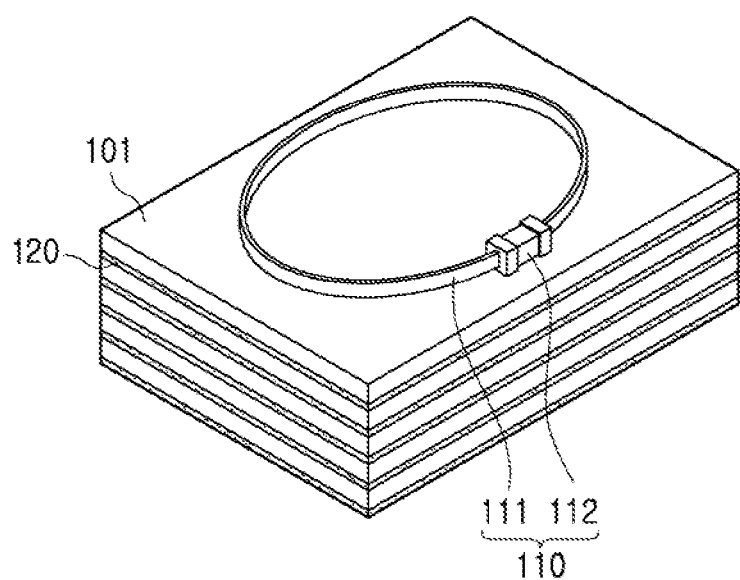

FIG. 10 illustrates an example in which the magnetic layer 101 includes a plurality of magnetic layers forming a stacked structure, thereby improving shielding performance through the magnetic layer 101. In this case, in consideration of a desired shielding performance, a size of a shielding structure and a number of magnetic layers in the magnetic layer 101 may be determined. A bonding layer 120, such as double-sided tape, is disposed between adjacent magnetic layers, thereby securing structural stability. In the example in FIG. 10, the conductor 111 is disposed on a surface of the stacked structure formed by the plurality of magnetic layers of the magnetic layer 101.

Figure 11:
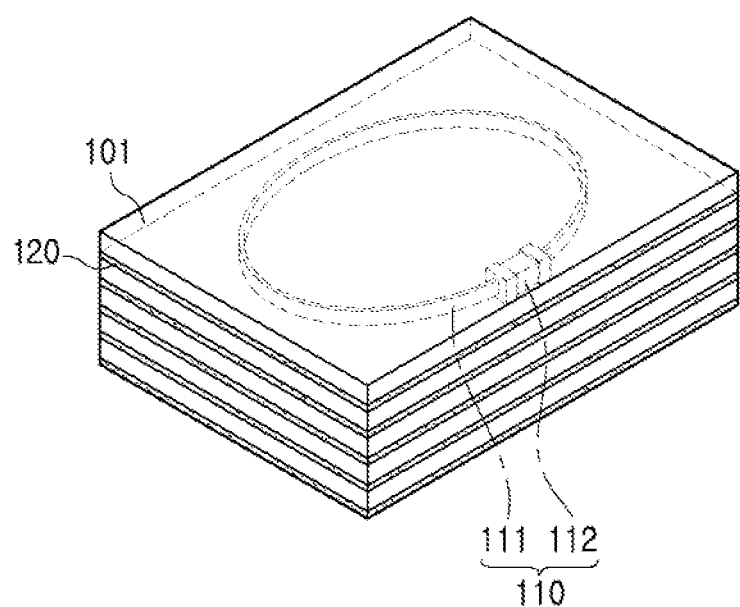

FIG. 11 illustrates another example in which the conductor 111 is interposed between two adjacent magnetic layers of the stacked structure formed by the plurality of magnetic layers of the magnetic layer 101.

Figure 12:
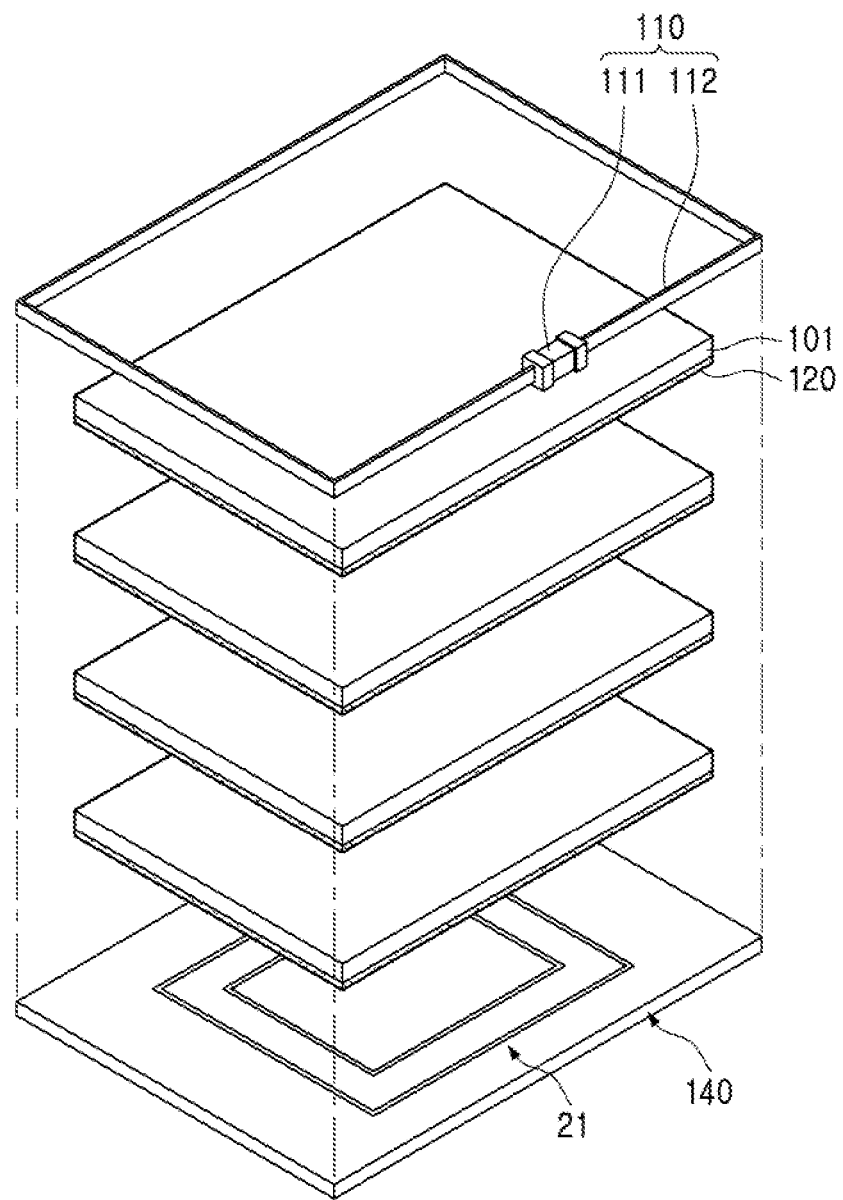
FIG. 12 illustrates an example of a main composition of a mobile device.

FIG. 12 illustrates an example of a main composition of a mobile device.

Referring to FIGS. 1, 2, and 12, a mobile device includes a mobile device body, a battery 22, and a power receiving coil 21 supported by a substrate 140. A magnetic field shielding structure 100 is interposed between the battery 22 and the power receiving coil 21 supported by the substrate 140. The magnetic field shielding structure 100 includes a magnetic layer 101 and a resonance reactive shielding circuit 110. The magnetic layer 101 has a stacked structure in which a plurality of magnetic layers are stacked. A conductor 111 having a loop form surrounds a side surface of the stacked structure.

The resonance reactive shielding circuit 110 includes the conductor 111 having a loop form and a capacitor 112 to perform a function to block a magnetic field by a resonance reaction. The magnetic layer 101 is interposed between the resonance reactive shielding circuit 110 and the power receiving coil 21 supported by the substrate 140. In other words, the resonance reactive shielding circuit 110 is separated from the power receiving coil 21 supported by the substrate 140 by the magnetic layer 101. Such a structure reduces an unnecessary coupling between the resonance reactive shielding circuit 110 and the power receiving coil 21.

Figure 13:
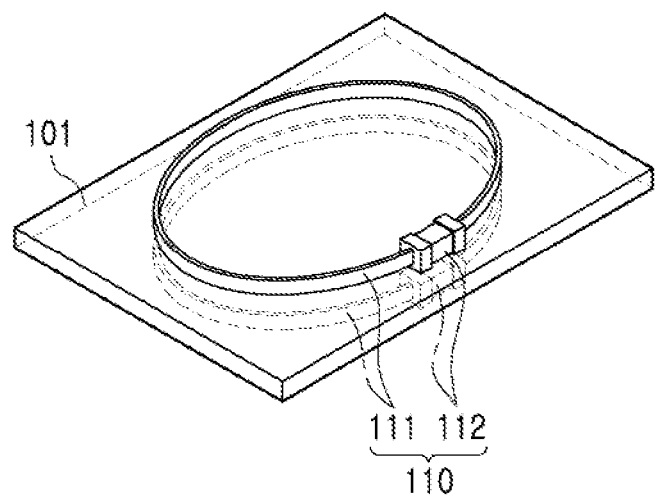
FIGS. 13 and 14 illustrate other examples of a magnetic field shielding structure.
Figure 14:
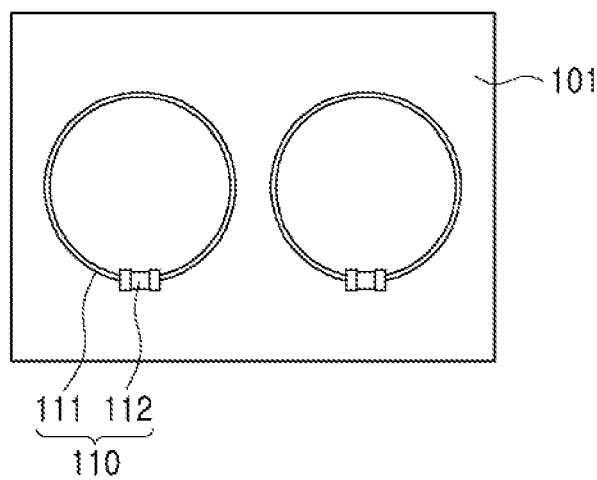

FIGS. 13 and 14 illustrate other examples of a magnetic field shielding structure. FIGS. 13 and 14 illustrate examples of a magnetic shielding structure in which a plurality of resonance reactive shielding circuits 110 are provided to improve shielding performance and characteristics. FIGS. 13 and 14 illustrate examples in which two resonance reactive shielding circuits 110 are provided. However, depending on a size of a magnetic layer 101, three or more resonance reactive shielding circuits 110 may be provided.

FIG. 13 illustrates an example in which a conductor 111 and a capacitor 112 of one resonance reactive shielding circuit 110 are disposed on one surface of the magnetic layer 101 on one side of the magnetic layer 101, and a conductor 111 and a capacitor 112 of another resonance reactive shielding circuit 110 are disposed on another surface of the magnetic layer 101 on an opposite side of the magnetic layer 101 from the one side of the magnetic layer 101. However, as described above, the capacitors 112 may be disposed in other locations.

FIG. 13 illustrates an example in which conductors 111 and capacitors 112 of two resonance reactive shielding circuits 110 are disposed on one surface of the magnetic layer 101.

The examples described above enable a magnetic field shielding structure and a mobile device to be miniaturized due to a reduced thickness of the magnetic field structure and to have an excellent shielding performance.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A magnetic field shielding structure comprising:
   a magnetic layer; and
   a resonance reactive shielding circuit comprising a capacitor and a conductor, the conductor connected to the capacitor and having a loop form,
   wherein the magnetic layer and the conductor are on a same level, and
   wherein the conductor surrounds all side surfaces of the magnetic layer.

2. The magnetic field shielding structure of claim 1, wherein the capacitor is on a surface of the magnetic layer.

3. The magnetic field shielding structure of claim 1, further comprising:
   a bonding layer interposed between the magnetic layer and the conductor and bonding the magnetic layer to the conductor.

4. The magnetic field shielding structure of claim 1, wherein the conductor is a conductor in a circuit board.

5. The magnetic field shielding structure of claim 1, wherein the capacitor is a multilayer ceramic capacitor.

6. The magnetic field shielding structure of claim 1, wherein the conductor is a coil having at least two turns.

7. The magnetic field shielding structure of claim 6, wherein the coil is a solenoid.

8. The magnetic field shielding structure of claim 6, wherein different turns of the coil are on a same level.

9. The magnetic field shielding structure of claim 1, wherein the capacitor and the conductor form an LC circuit.

10. The magnetic field shielding structure of claim 1, wherein the resonance reactive shielding circuit is electrically isolated.

11. The magnetic field shielding structure of claim 1, wherein the magnetic layer comprises a plurality of magnetic layers in a stacked structure.

12. The magnetic field shielding structure of claim 1, further comprising:
    an additional resonance reactive shielding circuit.

13. A mobile device comprising:
    a mobile device body;
    a battery;
    a coil portion; and
    a magnetic field shielding structure interposed between the battery and the coil portion, the magnetic field shielding structure comprising a magnetic layer and a resonance reactive shielding circuit, the resonance reactive shielding circuit comprising a capacitor and a conductor, the conductor connected to the capacitor and having a loop form,
    wherein the magnetic layer and the conductor are on a same level, and
    wherein the conductor surrounds all side surfaces of the magnetic layer.

14. A magnetic field shielding structure comprising:
    a magnetic layer; and
    a resonance reactive shielding circuit configured to block at least a portion of a magnetic field passing through the magnetic layer, the resonance reactive shielding circuit comprising a capacitor and a conductor, the conductor connected to both ends of the capacitor and having a loop form,
    wherein the magnetic layer and the conductor are on a same level, and
    wherein the conductor surrounds all side surfaces of the magnetic layer.

15. The magnetic field shielding structure of claim 14, wherein the resonance reactive shielding circuit has a resonant frequency substantially equal to a frequency of the magnetic field.

16. A mobile device comprising:
    a mobile device body;
    a battery in the mobile device body;

a power receiving coil in the mobile device body, the power receiving coil configured to receive wireless power by either one or both of magnetic induction and magnetic resonance; and a magnetic field shielding structure in the mobile device body between the battery and the power receiving coil, the magnetic field shielding structure configured to block at least a portion of a magnetic field generated by the power receiving coil from reaching the battery, wherein the magnetic field shielding structure comprises, a magnetic layer configured to block at least a portion of the magnetic field generated by the power receiving coil from passing through the magnetic layer, and a resonance reactive shielding circuit configured to block at least a portion of any leakage magnetic field passing through the magnetic layer from the magnetic field generated by the power receiving coil, the resonance reactive shielding circuit comprising a capacitor and a conductor, the conductor connected to both ends of the capacitor and having a loop form, wherein the magnetic layer and the conductor are on a same level, and wherein the conductor surrounds all side surfaces of the magnetic layer.

17. The mobile device of claim 16, wherein the magnetic layer is further configured to block the at least a portion of the magnetic field generated by the power receiving coil by a magnetic induction method; and the resonance reactive shielding circuit is further configured to block the at least a portion of any leakage magnetic field passing through the magnetic layer by a magnetic resonance method.

* * * * *